(12) United States Patent
Kim et al.

(10) Patent No.: US 9,515,542 B2
(45) Date of Patent: Dec. 6, 2016

(54) VOICE COIL MOTOR

(71) Applicant: LG INNOTEK CO., LTD., Seoul (KR)

(72) Inventors: Seungki Kim, Seoul (KR); Kyoungho Yoo, Seoul (KR)

(73) Assignee: LG INNOTEK, CO., LTD., Seoul (KR)

( * ) Notice: Subject to any disclaimer, the term of this patent is extended or adjusted under 35 U.S.C. 154(b) by 0 days.

(21) Appl. No.: 14/538,410

(22) Filed: Nov. 11, 2014

(65) Prior Publication Data

US 2015/0061415 A1  Mar. 5, 2015

Related U.S. Application Data

(63) Continuation of application No. 13/324,440, filed on Dec. 13, 2011, now Pat. No. 8,912,690.

(30) Foreign Application Priority Data

Dec. 13, 2010  (KR) .......................... 10-2010-0126646
Dec. 13, 2010  (KR) .......................... 10-2010-0126648

(51) Int. Cl.
*H02K 41/03* (2006.01)
*H02K 5/10* (2006.01)
(Continued)

(52) U.S. Cl.
CPC ............. *H02K 41/0356* (2013.01); *G02B 7/08* (2013.01); *G03B 3/10* (2013.01); *H02K 5/10* (2013.01); *G03B 2205/0069* (2013.01)

(58) Field of Classification Search
CPC .............................. H02K 41/0354; G02B 7/04
(Continued)

(56) References Cited

U.S. PATENT DOCUMENTS 7,206,145 B2  4/2007  Otaka et al.
7,522,352 B2  4/2009  Huang et al.
(Continued)

FOREIGN PATENT DOCUMENTS

JP  2003-259485 A  9/2003
JP  2006-227102 A  8/2006
(Continued)

OTHER PUBLICATIONS

Office Action dated Jul. 12, 2012 in Korean Application No. 10-2010-0126646, filed Dec. 13, 2010.
(Continued)

*Primary Examiner* — Thomas Truong
(74) *Attorney, Agent, or Firm* — Saliwanchik, Lloyd & Eisenschenk

(57) ABSTRACT

Disclosed is a voice coil motor, the motor including a rotor having a cylindrical bobbin that has a support block protruding from an upper end of an outer circumference thereof and a coil block that is coupled to the outer circumference of the bobbin in a direction from a lower surface to an upper surface of the bobbin and is supported by the support block, a stator having a magnet facing the coil block and a yoke holding the magnet, elastic members coupled to upper and lower surfaces of the bobbin, respectively, a base supporting the stator and the elastic members, and a foreign substance inflow-prevention portion formed on an upper surface of the base in such a way as to protrude around an opening formed in a central portion of the base in a shape of a closed loop.

15 Claims, 3 Drawing Sheets

(51) Int. Cl.
 *H02K 41/035* (2006.01)
 *G02B 7/08* (2006.01)
 *G03B 3/10* (2006.01)

(58) Field of Classification Search
 USPC ............... 310/12.16; 359/824, 511, 513, 507
 See application file for complete search history.

(56) References Cited

U.S. PATENT DOCUMENTS

2008/0117536 A1\* 5/2008 Higuchi ........................ 359/824
2008/0259470 A1 10/2008 Chung
2009/0015948 A1 1/2009 Wada et al.
2010/0149666 A1 6/2010 Liao
2011/0310501 A1 12/2011 Min et al.

FOREIGN PATENT DOCUMENTS

KR  10-2008-0046819 A   5/2008
KR  10-2008-0076841 A   8/2008
KR  10-2010-0123965 A  11/2010

OTHER PUBLICATIONS

Office Action dated Jul. 12, 2012 in Korean Application No. 10-2010-0126648, filed Dec. 13, 2010.

\* cited by examiner

VOICE COIL MOTOR

CROSS-REFERENCE TO RELATED APPLICATIONS

This application is a continuation of U.S. application Ser. No. 13/324,440, filed Dec. 13, 2011, which claims the benefit under 35 U.S.C. §119 of Korean Application Nos. 10-2010-0126646 and 10-2010-0126648, filed Dec. 13, 2010, which are hereby incorporated by reference in their entirety.

BACKGROUND OF THE INVENTION

Field of the Invention

The present invention relates to a voice coil motor.

Description of Related Art

Recently, a portable communication apparatus is provided with a camera module to store an image or a moving image. The camera module includes an image sensor module for converting external light to an image, and a lens for focusing the external light on the image sensor module.

The conventional camera module is problematic in that it is impossible to adjust a distance between the lens and the image sensor module, so that it is difficult to obtain a desired image. However, in order to solve the problem, a voice coil motor for adjusting the distance between the lens and the image sensor module of the camera module is recently developed.

The conventional voice coil motor includes a bobbin receiving a lens, a coil block wound around the bobbin, a magnet facing the coil block, an elastic member elastically supporting the bobbin, and a base supporting the bobbin. The voice coil motor adjusts an interval between the lens received in the bobbin and the image sensor module, using attractive force and repulsive force generated by a magnetic field between the coil block and the magnet.

In the conventional voice coil motor, the coil block is mounted in a direction from an upper surface to a lower surface of the bobbin, and a protrusion is provided on a lower end of an outer circumference of the bobbin to support the coil block.

However, the conventional voice coil motor is problematic in that the protrusion for supporting the coil block is provided on the lower end of the outer circumference of the bobbin, so that all structures for inhibiting rotation of the bobbin concentrate on the lower surface of the bobbin, thus making structures of the bobbin and the base complicated.

Further, the conventional voice coil motor is problematic in that the structures of the bobbin and the base are complicated, so that it is difficult to create a configuration or a shape for inhibiting foreign substances from flowing through the base into the image sensor module.

BRIEF SUMMARY

Accordingly, the present invention provides a voice coil motor, in which a coil block coupled to a bobbin is mounted in a direction from a lower surface to an upper surface of the bobbin, so that components for smoothly driving the bobbin are disposed on the upper surface of the bobbin so as to enhance space utilization of the bobbin and a base, and inflow of foreign substances from the base to an image sensor module is inhibited.

In one general aspect of the present invention, there is provided a voice coil motor, the motor comprising a rotor including a bobbin and a coil block coupled to an outer circumference of the bobbin; a stator including a magnet facing the coil block and a yoke holding the magnet; elastic members coupled to upper and lower surfaces of the bobbin, respectively; and a base supporting the stator and the elastic members, wherein a foreign substance inflow-prevention portion protrudes around an opening formed in the base.

In another aspect, there is provided a voice coil motor, the motor comprising a rotor including a bobbin and a coil block coupled to an outer circumference of the bobbin; a stator including a magnet facing the coil block and a yoke holding the magnet; elastic members including an upper elastic member coupled to an upper surface of the bobbin and supported by the yoke, and a lower elastic member coupled to a lower surface opposite to the upper surface of the bobbin; and a base supporting the rotor, the stator and the elastic members, wherein the bobbin includes a support block protruding from the outer circumference of the bobbin adjacent to the upper surface thereof to support the coil block.

In a further aspect, there is provided a voice coil motor, the motor comprising a rotor including a bobbin and a coil block, the bobbin having a support block protruding from an upper end of an outer circumference thereof, the coil block being coupled to the outer circumference of the bobbin in a direction from a lower surface to an upper surface of the bobbin and being supported by the support block; a stator including a magnet facing the coil block and a yoke holding the magnet; elastic members coupled to upper and lower surfaces of the bobbin, respectively; and a base supporting the stator and the elastic members, wherein a foreign substance inflow-prevention portion protrudes around an opening formed in a central portion of the base.

In yet another aspect, there is provided a voice coil motor, the motor comprising a rotor including a bobbin and a coil block coupled to an outer circumference of the bobbin; a stator including a magnet facing the coil block and a yoke holding the magnet; elastic members including an upper elastic member coupled to an upper surface of the bobbin and supported by the yoke, and a lower elastic member coupled to a lower surface opposite to the upper surface of the bobbin; and a base supporting the rotor, the stator and the elastic members, wherein a foreign substance inflow-prevention portion protrudes around an opening formed in a central portion of the base, and the bobbin includes a support block protruding from the outer circumference of the bobbin adjacent to the upper surface thereof to support the coil block.

The voice coil motor according to the present invention is advantageous in that the support block is provided to mount the coil block in the direction from the lower surface to the upper surface of the bobbin and to support the coil block on the upper end of the outer circumference of the bobbin, the anti-rotation portion and the space receiving the stopper of the housing are provided on the support block, thus enhancing space utilization of the bobbin and the base, and a foreign substance inflow-prevention portion is formed in the upper surface of the base having the enhanced space, thus inhibiting the image sensor module from being contaminated by foreign substances introduced into the gap between the rotor and the stator.

DETAILED DESCRIPTION

Figure 1:
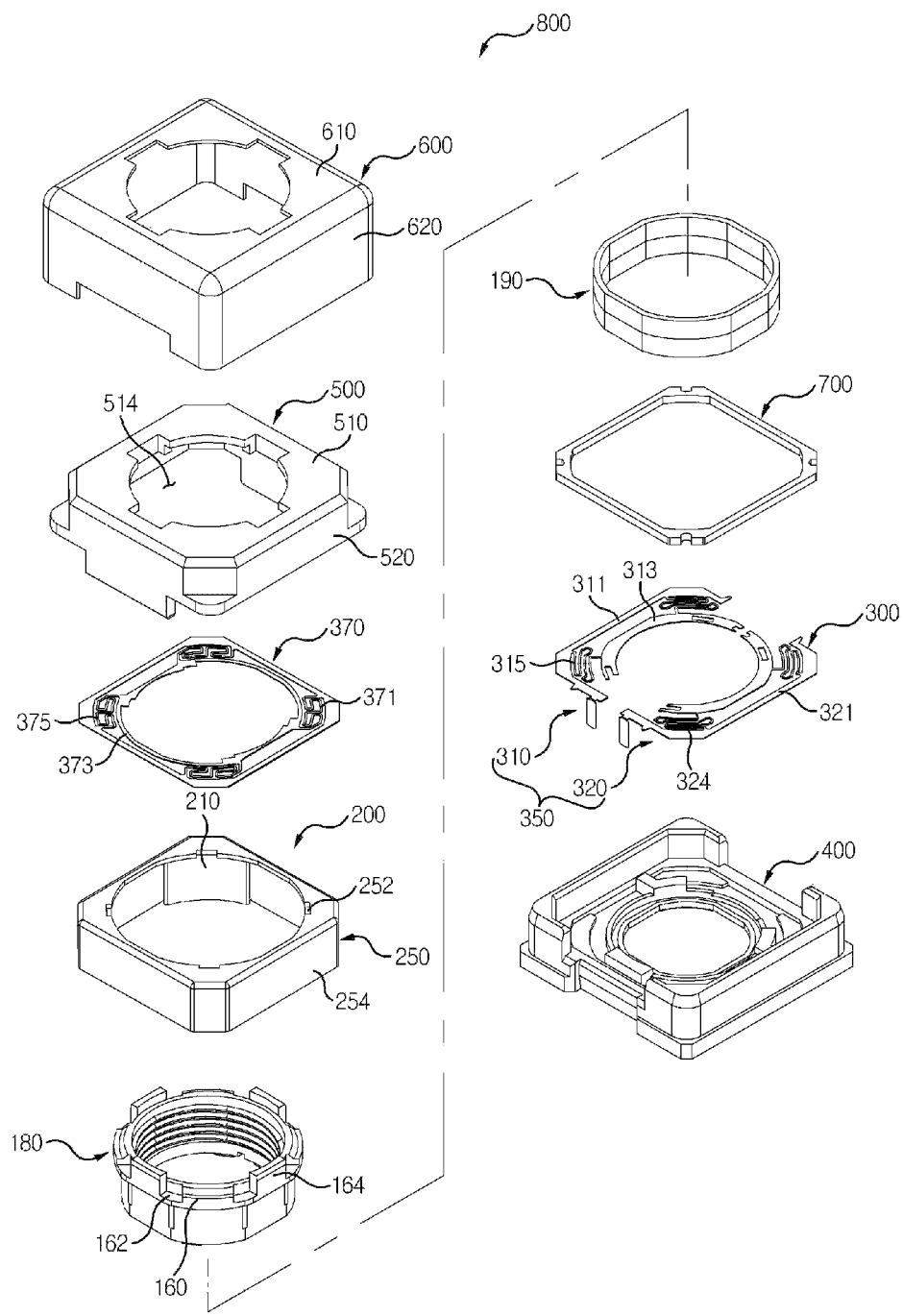
FIG. 1 is an exploded perspective view showing a voice coil motor in accordance with an exemplary embodiment of the present invention.
Figure 2:
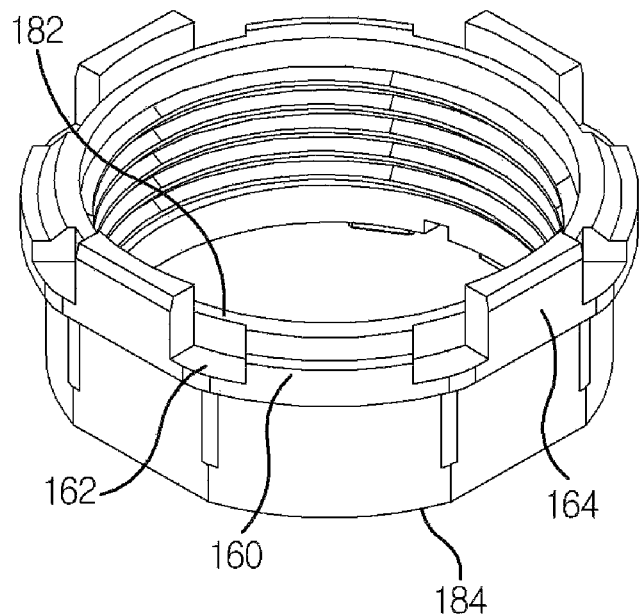
FIG. 2 is a perspective view showing a bobbin of FIG. 1.
Figure 3:
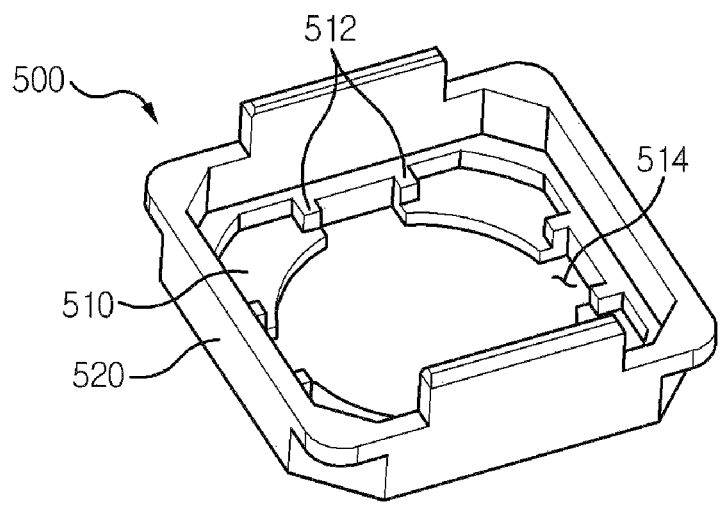
FIG. 3 is a rear perspective view showing a housing of FIG. 1.
Figure 4:
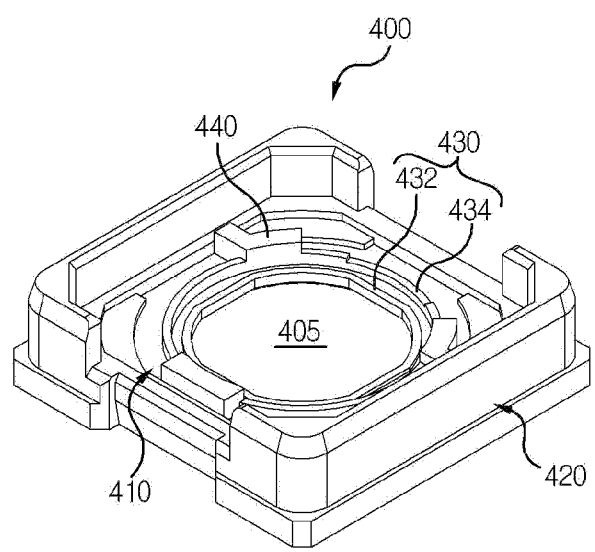
FIG. 4 is a perspective view showing a base of FIG. 1.

FIG. 1 is an exploded perspective view showing a voice coil motor in accordance with an exemplary embodiment of the present invention. FIG. 2 is a perspective view showing a bobbin of FIG. 1. FIG. 3 is a rear perspective view showing a housing of FIG. 1. FIG. 4 is a perspective view showing a base of FIG. 1.

Referring to FIG. 1, a voice coil motor 800 includes a rotor 100, a stator 200, an elastic member 300 and a base 400. In addition to these components, the voice coil motor 800 may further include a housing 500, a cover can 600 and a spacer 700.

The rotor 100 accommodates a lens, and functions to adjust an interval between the lens and an image sensor module disposed on a rear of the base 400 that will be described below in detail.

The rotor 100 includes a bobbin 180 and a coil block 190.

Referring to FIG. 2, the bobbin 180 functions to support the lens. The bobbin 180 for supporting the lens takes a shape of a pipe which is open at an upper surface 182 and a lower surface 184 thereof. A threaded portion may be formed on an inner surface of the bobbin 180 to fasten the lens. The bobbin 180 may be manufactured by injection molding using a synthetic resin, for example.

A support block 160 may be provided on an outer surface of the bobbin 180. The support block 160 functions to support the coil block 190 that will be described below in detail. The support block 160 is formed along an outer circumference of the bobbin 180 adjacent to the upper surface 182 of the bobbin 180. The support block 160 is formed in a shape of a rim along the outer surface of the bobbin 180.

A plurality of anti-rotation portions 164 protrudes upwards from an upper surface 162 of the support block 160. For example, four anti-rotation portions 164 protrude from the upper surface 162 of the support block 160 in such a way as to be disposed at regular intervals on the upper surface 162 of the support block 160. Also, recess parts (not labeled) can be present between the anti-rotation portions 164. For example, a pair of recess parts can be present between each anti-rotation portion 164 and the adjacent anti-rotation portion 164. The recess parts are shown in FIGS. 1 and 2 between adjacent anti-rotation portions 164 (see, e.g., the recessed portion just above where reference numeral 162, for the upper surface of the support block, points).

According to an embodiment of the present invention, the anti-rotation portions 164 provided on the upper surface 162 of the support block 160 protrude from the upper surface 182 of the bobbin 180. The anti-rotation portions 164 inhibit the bobbin 180 from rotating when rotating force is applied to the bobbin 180 for various reasons.

Predetermined portions of the upper surface 162 of the support block 160 corresponding to opposite sides of each anti-rotation portion 164 are brought into stoppers of the housing 500 that will be described below.

The coil block 190 is disposed on the outer circumference of the bobbin 180, and is stuck to the outer circumference of the bobbin 180 using an adhesive.

The coil block 190 has a shape of a cylinder formed by winding long wire coated with an insulation resin, such as an enamel resin, in such a way as to be fitted over the outer circumference of the bobbin 180. Otherwise, the coil block 190 may also be formed by directly winding the long wire coated with the insulation resin around the outer circumference of the bobbin 180.

Opposite ends of the coil block 190 are electrically connected to a lower elastic member 350 of the elastic member 300 that will be described below.

The stator 200 includes magnets 210 and a yoke 250.

The yoke 250 includes a top plate 252 and a side plate 254. According to an embodiment of the present invention, the yoke 250 is manufactured by machining a metal plate so as to inhibit flux leakage of the magnets 210 and block harmful electromagnetic waves.

For example, the top plate 252 of the yoke 250 is shaped likes a rectangular plate, with an opening being formed in a central portion of the top plate 252 to expose the bobbin 180 to an outside thereof.

The side plate 254 of the yoke 250 extends from an edge of the top plate 252 towards the coil block 190. The rotor 100 is accommodated in a space defined by the top plate 252 and the side plate 254.

The magnets 210 are provided on respective corners on an inner surface of the side plate 254 to face the coil block 190. Attractive force or repulsive force between a magnetic field generated from the magnets 210 and a magnetic field generated from the coil block 190 provides upward or downward moving force to the rotor 100.

The elastic member 300 includes the lower elastic member 350 and an upper elastic member 370. The elastic member 300 elastically biases the rotor 100 that has moved upwards from the base 400, and besides restores the rotor 100 to its original position.

The lower elastic member 350 comprises first and second lower elastic members 310 and 320. The first and second lower elastic members 310 and 320 elastically support the lower surface 184 of the bobbin 180. The first and second lower elastic members 310 and 320 are elastically insulated from each other.

The first and second lower elastic members 310 and 320 include outer elastic portions 311 and 321, inner elastic portions 313 and 323 and elastic coupling portions 315 and 325, respectively.

The inner elastic portions 313 and 323 are coupled to the lower surface 184 of the bobbin 180, the outer elastic portions 311 and 321 are disposed outside the inner elastic portions 313 and 323, and the elastic coupling portions 315 and 325 couple the inner elastic portions 313 and 323 with the corresponding outer elastic portions 311 and 321. The elastic coupling portions 315 and 325 generate elastic force to elastically support the bobbin 180. When viewed on a plane, each of the elastic coupling portions 315 and 325 is arranged in a zigzag mode to generate elastic force.

The inner elastic portions 313 and 323 of the first and second lower elastic members 310 and 320 of the lower elastic member 350 are electrically connected to respective ends of the coil block 190. Since the first and second lower elastic members 310 and 320 are electrically connected to the respective ends of the coil block 190, the coil block 190 generates the magnetic field for driving the rotor 100 as a driving signal is applied to the first and second lower elastic members 310 and 320.

The upper elastic member 370 includes an outer elastic portion 371, an inner elastic portion 373 and an elastic coupling portion 375. The inner elastic portion 373 is coupled to the upper surface 182 of the bobbin 180, and the elastic coupling portion 375 couples the inner elastic portion 373 with the outer elastic portion 371.

In an embodiment of the present invention, the inner elastic portion 373 of the upper elastic member 370 is placed on the bobbin 180, and the inner elastic portion 373 and the bobbin 180 are stuck to each other using an adhesive.

The base 400 is disposed under the lower elastic member 350, and has a bottom plate 410 and a coupling plate 420.

The bottom plate 410 is shaped like a rectangular plate, for example. An opening 405 is formed in a central portion of the bottom plate 410, and an IR filter and an image sensor module are provided on a rear of the bottom plate 410.

Meanwhile, the IR filter or the image sensor module provided on the rear of the bottom plate 410 may be easily contaminated by foreign substances introduced into a gap between the rotor 100 and the stator 200. When the foreign substances adhere to the IR filter or the image sensor module, the foreign substances block some of light incident to the IR filter or the image sensor module through the lens mounted to the bobbin 180, thus considerably deteriorating a quality of an image or a moving image produced from the image sensor module.

According to an embodiment of the present invention, the support block 160 is provided on the upper end of the outer surface of the bobbin 180, and the anti-rotation portions 164 are formed on the support block 160, thus defining a foreign substance inflow-prevention portion 430 on the bottom plate 410 of the simplified base 400.

The foreign substance inflow-prevention portion 430 inhibit foreign substances, such as fine dust, introduced into the gap between the rotor 100 and the stator 200 from entering the IR filter or the image sensor module secured to the base 400.

The foreign substance inflow-prevention portion 430 is formed around the opening 405 that is formed in the bottom plate 410 of the base 400. At least one foreign substance inflow-prevention portion 430 may be formed in the bottom plate 410 of the base 400.

In an embodiment of the present invention, when viewed on a plane, the foreign substance inflow-prevention portion 430 may be shaped like a closed loop fence around the opening 405 formed in the bottom plate 410 of the base 400.

The foreign substance inflow-prevention portion 430 shaped like the closed loop fence serves as a foreign-substance blocking wall to inhibit foreign substances from being introduced through the gap between the rotor 100 and the stator 200 into the IR filter or the image sensor module, thus inhibiting the IR filter or the image sensor module from being contaminated by the foreign substances.

The foreign substance inflow-prevention portion 430 shaped like the closed loop fence may have the same height when measured from the bottom plate 410 of the base 400. Otherwise, a predetermined portion of the foreign substance inflow-prevention portion 430 may be formed at a first height so as not to interfere with the lower elastic member 350 disposed on the lower surface of the bobbin 180 facing the upper surface of the bottom plate 410 of the base 400, and a remaining portion of the foreign substance inflow-prevention portion 430 may be formed at a second height different from the first height.

According to an embodiment of the present invention, at least two foreign substance inflow-prevention portions 430 may be formed in the bobbin 180 facing the upper surface of the bottom plate 410 of the base 400 so as to more efficiently inhibit the inflow of foreign substances.

The foreign substance inflow-prevention portion 430 may include a first foreign substance inflow-prevention portion 432 and a second foreign substance inflow-prevention portion 434.

The first foreign substance inflow-prevention portion 432 protrudes from the upper surface of the bottom plate 410 of the base 400 in such a way as to be located around the opening 405 formed in the bottom plate 410 of the base 400. The first foreign substance inflow-prevention portion 432 may have an annular shape, when viewed on a plane.

The second foreign substance inflow-prevention portion 434 protrudes from the upper surface of the bottom plate 410 of the base 400, and is disposed outside the first foreign substance inflow-prevention portion 432. The second foreign substance inflow-prevention portion 434 may have an annular shape, when viewed on a plane.

According to an embodiment of the present invention, the first and second foreign substance inflow-prevention portions 432 and 434 may be formed at the same height when measured from the upper surface of the bottom plate 410 of the base 400. Otherwise, the first and second foreign substance inflow-prevention portions 432 and 434 may be formed at different heights when measured from the upper surface of the bottom plate 410 of the base 400.

Meanwhile, the first foreign substance inflow-prevention portion 432 may be formed at the first height so as not to interfere with the lower surface of the bobbin 180 facing the upper surface of the bottom plate 410 of the base 400 or the lower elastic member 350, and the second foreign substance inflow-prevention portion 434 may be formed at the second height higher than the first height.

A predetermined portion of the second foreign substance inflow-prevention portion 434 may have a different height so as not to interfere with the lower elastic member 350 coupled to the lower surface of the bobbin 180 facing the base 400.

A pad 440 may be formed on the upper surface of the base 400 to be in contact with the lower surface of the bobbin 180. For example, the pad 440 may be connected to the second foreign substance inflow-prevention portion 434.

Turning back to FIG. 4, the coupling plate 420 of the base 400 extends from an edge of the upper surface of the bottom plate 410 towards the bobbin 180, and is assembled with the housing 500 and the cover can 600 that will be described below in detail.

The spacer 700 is interposed between the upper surface of the bottom plate 410 of the base 400 and an end of the side plate 254 of the yoke 250. The spacer 700 presses the lower elastic member 350 of the elastic member 300 against the upper surface of the bottom plate 410 of the base 400 to secure the lower elastic member 350 to the upper surface of the bottom plate 410.

Referring to FIG. 3, the housing 500 includes a top plate 510 that has an opening to expose the bobbin 180 to an outside thereof, and a side plate 520 that protrudes from an edge of the top plate 510 of the housing 500. The housing 500 surrounds the yoke 250 of the stator 200.

The stoppers 512 protrude from an inner surface of the top plate 510 of the housing 500 corresponding to opposite sides of each anti-rotation portion 164 of the support block 160 formed on the bobbin 180. For example, the stoppers 512 may be provided on opposite sides of each anti-rotation portion 164 of the support block 160 formed on the bobbin 180.

The stoppers 512 formed on opposite sides of the top plate 510 are in brought into contact with the upper surface of the support block 160, thus limiting an upward moving distance of the bobbin 180.

Meanwhile, guide recesses 514 are formed in the top plate 510 of the housing 500 at positions corresponding to the anti-rotation portions 164. The guide recesses 514 are formed by cutting the top plate 510 of the housing 500 at positions corresponding to the anti-rotation portions 164. Each guide recess 514 maintains a predetermined gap with the corresponding anti-rotation portion 164. Each guide recess 514 is brought into contact with the anti-rotation portion 164 when the bobbin 180 is rotated for several reasons, thus inhibiting the rotation of the bobbin 180 and thereby inhibiting the elastic member 300 coupled to the bobbin 180 from being deformed, damaged and broken.

The cover can 600 includes a top plate 610 and a side plate 620. The cover can 600 is shaped like a rectangular plate, with an opening being formed in the cover can 600 to expose the bobbin 180 to an outside thereof. The side plate 620 extends from the top plate 610 to surround the rotor 100 and the stator 200. The side plate 620 is secured to the coupling plate 420 of the base 400.

As described above, the present invention provides a voice coil motor, in which a support block is provided to mount a coil block in a direction from a lower surface to a upper surface of a bobbin and to support the coil block on an upper end of an outer circumference of the bobbin, an anti-rotation portion and a space receiving a stopper of a housing are provided on the support block, thus enhancing space utilization of the bobbin and a base, and a foreign substance inflow-prevention portion is formed in an upper surface of the base having the enhanced space, thus inhibiting an image sensor module from being contaminated by foreign substances introduced into a gap between a rotor and a stator.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A voice coil motor, comprising:
a housing including a top plate formed with an opening and a side plate downwardly extended from the top plate, wherein first, second, third, and fourth groove portions are formed by being outwardly recessed from an inner circumferential surface forming the opening of the top plate such that a first protruding portion is formed between the first groove portion and the second groove portion, a second protruding portion is formed between the second groove portion and the third groove portion, a third protruding portion is formed between the third groove portion and the fourth groove portion, and a fourth protruding portion is formed between the fourth groove portion and the first groove portion;
a bobbin disposed at an inner side of the housing and moving in a vertical direction;
a coil block disposed on the bobbin;
a magnet disposed inside the housing and facing the coil block;
an elastic member elastically supporting the bobbin; and
four anti-rotation portions upwardly protruded from an upper surface of the bobbin;
wherein the four anti-rotation portions comprise a first anti-rotation portion disposed between the fourth protruding portion and the first protruding portion, a second anti-rotation portion disposed between the first protruding portion and the second protruding portion, a third anti-rotation portion disposed between the second protruding portion and the third protruding portion, and a fourth anti-rotation portion disposed between the third protruding portion and the fourth protruding portion; and
wherein the first, second, third, and fourth protruding portions are overlapped with at least a portion of the bobbin in the horizontal direction.

2. The voice coil motor of claim 1, further comprising a base disposed at a bottom side of the housing, and
a foreign substance inflow-prevention portion protruding around an opening formed in a bottom plate of the base.

3. The voice coil motor of claim 2, wherein a predetermined portion of the foreign substance inflow-prevention portion is formed at a first height, and a remaining portion of the foreign substance inflow-prevention portion is formed at a second height different from the first height.

4. The voice coil motor of claim 1, wherein the elastic member includes a first plate spring and a second plate spring electrically insulated from each other, and
wherein one end of the coil block is electrically connected to the first plate spring and the other end of the coil block is electrically connected to the second plate spring.

5. The voice coil motor of claim 1, wherein a pad is protruded from an upper surface of a base and configured to be in contact with the lower surface of the bobbin.

6. The voice coil motor of claim 1, further comprising a yoke fixing the magnet,
wherein the housing covers the yoke.

7. A voice coil motor, comprising:
a housing including a top plate formed with an opening and a side plate downwardly extended from the top plate;
a bobbin disposed at an inner side of the housing and moving in a vertical direction;
a coil block disposed on the bobbin;
a magnet disposed inside the housing and facing the coil block;
an elastic member elastically supporting the bobbin;
a support block upwardly protruded from an upper surface of the bobbin; and
a protruding portion inwardly protruded from an inner surface forming the opening of the top plate;
wherein the support block includes a first anti-rotation portion and a second anti-rotation portion spaced from the first anti-rotation portion,
wherein the protruding portion is disposed between the first and the second anti-rotation portions, and
wherein the protruding portion is overlapped with at least a portion of the bobbin in the vertical direction.

8. The voice coil motor of claim 7, wherein the anti-rotation portions protrude higher than the upper surface of the bobbin.

9. The voice coil motor of claim 7, wherein the bobbin includes a recess part disposed between the first and the second adjacent anti-rotation portions, and
wherein the housing comprises at least one stopper each downwardly protruding from an inner surface of the top plate of the housing and disposed at the recess part.

10. The voice coil motor of claim 9, wherein the stopper is provided on each of opposite sides of each of the first and second anti-rotation portions.

11. The voice coil motor of claim 7, wherein the support block is protruded from the upper surface of the bobbin in a shape of a rim along an outer circumference of the bobbin.

12. The voice coil motor of claim 7, further comprising:
a cover can surrounding the housing and secured to a base, the cover can including a top plate exposing the bobbin to an outside thereof, and a side plate extending from the top plate of the cover can towards the base.

13. The voice coil motor of claim 7, wherein the elastic member includes an upper elastic member coupled to an upper surface of the bobbin and a lower elastic member coupled to a lower surface of the bobbin.

14. The voice coil motor of claim 7, further comprising a yoke fixing the magnet, and
wherein the housing covers the yoke.

15. The voice coil motor of claim 14, wherein the yoke includes a top plate that takes a shape of an octagonal plate and has an opening to expose the bobbin to an outside thereof, and a side plate that downwardly extends from an edge of the top plate of the yoke; and wherein the magnet is disposed on each corner of the side plate of the yoke.

* * * * *